United States Patent [19]

Manske

[11] Patent Number: 4,793,717
[45] Date of Patent: Dec. 27, 1988

[54] DEVICE FOR VISUALLY INDICATING A PRESSURE OR TEMPERATURE CONDITION

[75] Inventor: Wendell J. Manske, Birchwood, Minn.

[73] Assignee: Minnesota Mining and Manufacturing Company, St. Paul, Minn.

[21] Appl. No.: 375,376

[22] Filed: May 6, 1982

[51] Int. Cl.$^4$ ............................................. G01K 11/08
[52] U.S. Cl. ...................................... 374/160; 116/219
[58] Field of Search ............... 374/160, 161, 162, 102, 374/106; 116/219, 270; 426/88

[56] References Cited

U.S. PATENT DOCUMENTS

| | | | |
|---|---|---|---|
| 3,465,590 | 9/1969 | Kluth | 374/160 |
| 3,597,976 | 8/1971 | Fryar | 374/160 |
| 3,615,719 | 10/1971 | Michel | 374/160 |
| 3,665,770 | 5/1972 | Sagi | 374/160 |
| 3,922,917 | 12/1975 | Ayres | 374/160 |
| 3,954,011 | 5/1976 | Manske . | |
| 3,962,920 | 6/1976 | Manske | 374/160 |

FOREIGN PATENT DOCUMENTS 1558414  1/1980  United Kingdom ................ 116/270

Primary Examiner—William A. Cuchlinski, Jr.
Assistant Examiner—Patrick R. Scanlon
Attorney, Agent, or Firm—Donald M. Sell

[57] ABSTRACT

Indicating device suitable for visibly indicating conditions such as the application of force or pressure or the exposure to a critical temperature. The device includes a porous pad containing an indicating dyed chemical, a wick maintained in spaced relation to the pad and a snap action activating means. The activating means forces the wick into contact with the pad and dyed chemical migration provides visible indication of the application of force or pressure. The indicating dyed chemical may be frozen and the activating means engaged. Upon reaching a critical temperature the frozen chemical melts allowing dye migration into the wick and a visible indication of exposure to the critical temperature.

4 Claims, 3 Drawing Sheets

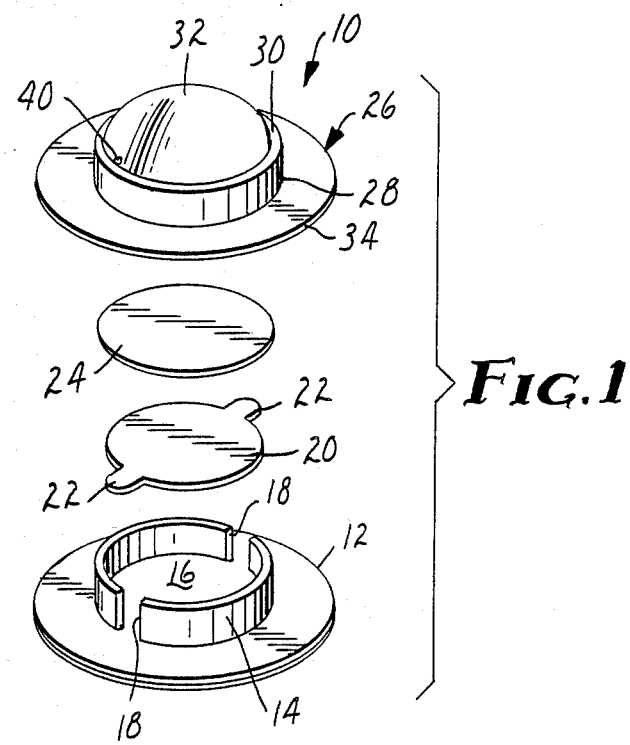
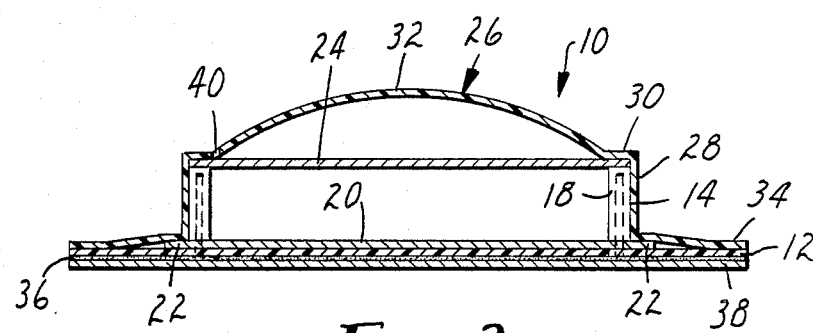
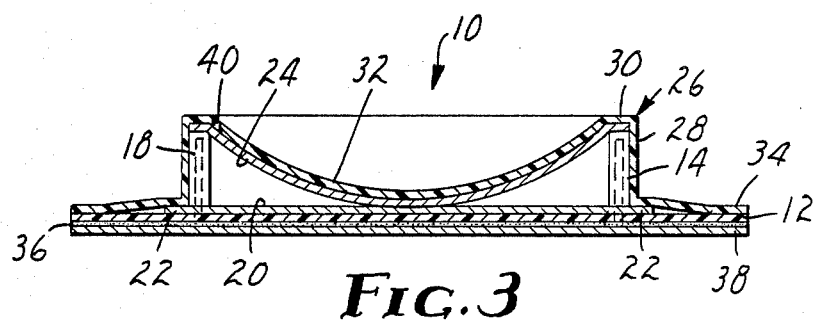

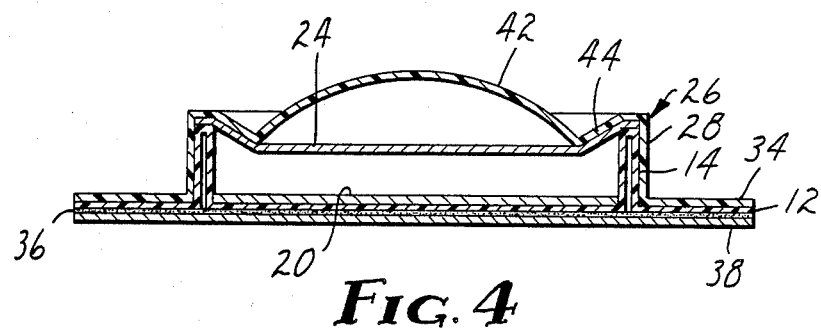
FIG. 4
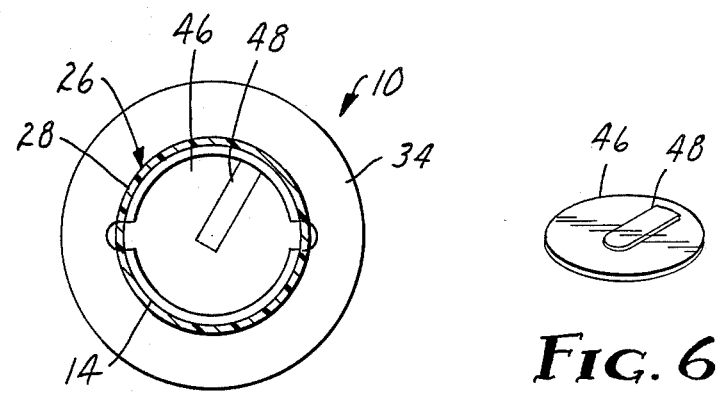
FIG. 5
FIG. 6

DEVICE FOR VISUALLY INDICATING A PRESSURE OR TEMPERATURE CONDITION

BACKGROUND OF THE INVENTION

1. Technical Field of Invention

The present invention relates to an inexpensive, disposable, irreversible indicator suitable for providing visual indication of exposure to a selected temperature of the application of a predetermined force or pressure to a package or product.

2. Description of the Prior Art

Various devices used to indicate visually the passage of a predetermined interval of time or to signal if frozen food packages have been subjected to defrosting conditions prior to reaching the consumer are known in the prior art. Some of the chemical timing devices which are known have involved the exposure of a wicking material to a free liquid source such as a pool of liquid, and have provided a chemical agent in the wick at some predetermined point which reacted with the liquid migrating along the wick to create a color change. Some devices have incorporated a porous, fibrous material saturated with a liquid as a substitute for the free pool to provide improved liquid containment and facilitate storage of the device. Other devices have incorporated an impervious barrier strip between the porous liquid containment pad and the wick to facilitate storage by preventing contact between the pad and the wick prior to intentional activation by removal of the impervious strip.

One such device is shown in U.S. Pat. No. 3,962,920, issued June 15, 1976 to Manske, and assigned to the assignee of the present invention, which teaches a wick superimposed over a porous pad containing a dyed chemical and having an impervious barrier imposed therebetween. Removal of the barrier permits migration of the dyed chemical from the pad to the wick and movement along the wick indicates a time interval. Further, a critical temperature indication is provided by impregnating the pad with a dye in solution with a chemical which remains solid until a particular temperature is reached. Although the device is activated by removal of the impervious barrier strip, a visual indication is not provided until the critical temperature is reached and the chemical becomes liquid, allowing the dyed chemical to migrate into the wick.

Another such device is shown in U.S. Pat. No. 3,954,011 issued May 4, 1976 to Manske, also assigned to the assignee of the present invention, which shows a resilient carrier which maintains the chemically impregnated pad separate from the wick, thus eliminating the need for an impervious barrier. The device will remain unactivated and liquid migration prevented until the wick is physically forced into contact with the pad and retained in such a relationship by the carrier.

Indicating devices which use free pools of liquid as a fluid source have many disadvantages. The use of a free pool of liquid inherently creates problems related to containing the liquid pool and maintaining separation of the liquid from the wick prior to activating the device, for example when shipping a supply of indicators. Provision of a liquid containing pad and imposition of a barrier strip between the liquid pad and the wick have proven expedient, however, these devices increase manufacturing and assembly costs Devices which maintain the liquid pad and the wick in a spaced relationship, such as the aforementioned U.S. Pat. No. 3,954,011, have succeeded in eliminating the impervious barrier strip, but have required relatively expensive means to do so.

SUMMARY OF THE INVENTION

The present invention has overcome the aforementioned disadvantages and provides an inexpensive, disposable, compact and reliable indicating device suitable for visually indicating the application of force or pressure or exposure to a critical temperature. The device can be conveniently stored at ambient conditions and subsequently activated simply and reliably.

The invention relates to the structure of an indicating device suitable for visually indicating the application of force or pressure or exposure to a critical temperature. In one embodiment, the device comprises a disc-shaped base having an upstanding annular wall and a mating cover to define an interior space. A liquid saturable porous pad containing a solution of a chemical and a dye is located within the space adjacent the base, and a circular indicating wick is captured between the upstanding wall and the cover and maintained in a spaced relationship to the porous pad. The cover includes a convergently sloped central portion which is preferably domed to present a shallowly curved convex surface movable between nonactivated and activated positions of stability and opposite curvature. Upon the application of force to its convex surface, the central portion snaps irreversibly to the activated concave position forcing the indicating wick into contact with the dye containing porous pad. Dyed chemical migrates from the pad to the wick and provides a visual indication through the cover that force has been applied to the device. The interior space between the cover and the base may be hermetically sealed from the ambient, in which case a predetermined exterior pressure will activate the domed central portion of the cover and provide a visual signal.

In another embodiment, the base is flat and the domed portion of the cover is separated from the base by a wall depending from the periphery of the domed portion. The spaced relationship of the wick and pad is maintained by bonding the wick to the inner surface of the domed portion of the cover.

In yet another embodiment, the wick is formed as a strip which provides an indication of the length of time the device has been exposed to the application of the force or pressure or to a critical temperature.

In any embodiment the wick may be an extensible absorbent material which stretches to reduce wrinkling as the material is deformed into contact with the porous pad, and the domed portion of the cover may be recessed toward the base to reduce accidental activation.

To indicate exposure to a critical temperature, the porous pad may be impregnated with a solution of a dye and a chemical which will remain in the solid phase until such temperature is reached. The device is placed on a surface, such as a wall or a package, and manually activated by pushing the dome from its non-activated to activated position after the chemical has been cooled to its solid phase. Although the wick will then be maintained in contact with the porous pad, dye migration will not occur since the chemical is in the solid phase. When the critical temperature is reached, the chemical changes from its solid to its liquid phase, migrates into the wick and provides a permanent visual indication that the product and the device have been exposed to a particular temperature.

BRIEF DESCRIPTION OF THE DRAWINGS

The present invention will be further described with reference to the accompanying drawing wherein like numbers refer to like parts in the several views, and wherein:

FIG. 1 is an exploded perspective view of one embodiment of the present invention, showing a base, a porous pad, an indicating wick and a cover;

FIG. 2 is a diametrical cross-section of the device of FIG. 1 showing the base, the porous pad, the indicating wick and a convexly curved dome in the non-activated position;

FIG. 3 is a diametrical cross-section of the embodiment of FIG. 1 showing the curved dome in the activated position;

FIG. 4 is a diametrical cross-section of a second embodiment of the invention which shows a recessed convexly curved dome designed to prevent accidental activation;

FIG. 5 is a plan view with the cover in section showing another embodiment in which the indicating wick is formed in the shape of a strip to indicate the passage of a time interval;

FIG. 6 is a perspective view showing the strip wick of FIG. 5 attached to a transparent locating member;

DETAILED DESCRIPTION

Figure 7:
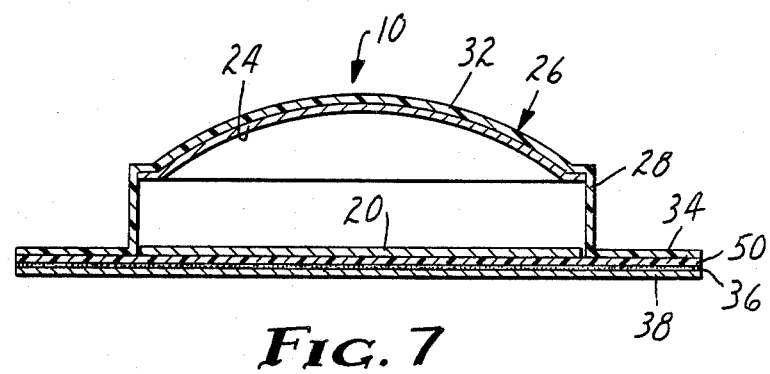
FIG. 7 is a diametrical cross-section of yet another embodiment of the invention in which the wick is attached to the cover and a portion of the base is eliminated.

Referring now to the drawings and particularly to FIGS. 1 and 2, there is shown an indicator 10 which includes a base 12 having integral upstanding arcuate walls defining shoulders 14 which in turn define an interior reservoir 16. The shoulders 14 are separated by diametrically opposed locating slots 18. The base 12 and the integral upstanding shoulders 14 may be constructed of any material having suitable rigidity, but due to weight consideration and contact with chemicals, are preferably formed of polyester film.

A liquid saturable-e porous pad 20 is sized to be accepted within the reservoir 16 adjacent the base 12. The pad 20 may be composed of any porous matrixed material which can absorb or entrap a liquid and which will allow the liquid to migrate into a wick when brought into contact with such a wick. Preferred matrices are fibrous materials made from woven or non-woven natural or synthetic fibers. Cellulosic materials such as blotter papers (i.e., "Bluebird Blotting Paper" by Sorg Paper Co.) are particularly desirable. The porous pad 20 includes diametrically extending tabs 22 which are adapted to fit within the base slots 18 and which extend beyond the outer surface of the shoulders 14. The tabs 22, in conjunction with the slots 18, prevent rotation of the porous pad 20 and are utilized to maintain the pad 20 adjacent the base 12 in a manner to be described hereinafter.

An indicating wick 24 formed in a thin, circular sheet from generally the same material used for the porous pad 20, is sized to rest upon the shoulders 14 and not extend beyond the outer surfaces of the upstanding shoulders 14. While the material comprising the indicating wick 24 may be the same material used to form the porous pad 20, the wick 24 must additionally be self-supporting to maintain its shape when supported only at its edge by the shoulders 14.

A cover 26 overlies the indicating wick 24, the porous pad 20 and the base 12 and includes a cylindrical wall 28 adapted to fit closely around the outer surface of the shoulders 14, an inwardly extending ledge 30 formed as an annular ring overlying the shoulders 14, a convergently sloped central portion 32 attached at its periphery to the ledge 30 and a perimetrical boundary 34 coextensive with the base 12. The boundary 34 may be attached to, or sealed to if preferable, the base 12 by any suitable means such as adhesive bonding, heat sealing, spot welding, or the like. The inwardly extending ledge 30 bears against the upstanding shoulders 14 and clamps the indicator wick 24 therebetween. The edge of the wick 24 is thus supported in a spaced relationship to the base 22 and the porous pad 20. Further, since the pad tabs 22 extend through the slots 18 and beyond the outer surface of the shoulders 14, the tabs 22 are contained between the boundary 34 and the base 12, simultaneously preventing rotation and upward movement of the tabs 22 and the attached pad 20.

It will be recognized that the tabs 22 may be eliminated and upward movement of the pad 20 prevented by fastening the pad 20 to the base 12 by such conventional means as adhesive bonding or mechanical fasteners.

Central to the cover 26 is the convergently sloped portion 32 which may assume any pyramidal or conical shape which will permit inversion, but for simplicity of manufacture is preferably formed as a shallowly curved convex spherical dome attached at its periphery to the ledge 30. The dome 32 had a radius selected to permit a "snap" movement between non-activated and activated positions of stability and opposite curvature, as shown in FIGS. 2 and 3, respectively. The cover 26 may be formed of any material suitable for the base 12, with the additional constraint that the domed portion 32 must be transparent to afford visual observation of the indicator wick 24.

FIG. 2 shows the dome 32 in its non-activated position; extending convexly away from the base 12. Upon application of force to the outer surface of the dome 32, the dome 32 travels a short distance and then snaps to its second position of stability, the activated position, which is exteriorly concave to press against the base 12 within the reservoir 16, as shown in FIG. 3.

When in the activated position, the dome 32 forces the indicating wick 24 into pressure contact with the porous pad 20. Since the wick 24 is deformed into a curve which is longer than the distance spanning the shoulders 14, the wick 24 will be pulled slightly from between the shoulders 14 and the cover 26. Due to the concentration gradient between the wick 24 and the pad 20, the dyed chemical migrates from the pad 20 to the wick 24, thus coloring the wick and providing a visual indication that the predetermined condition has occurred and the indicator activated.

After assembly, the outer surface of the base 12 is coated with a pressure sensitive adhesive 36 and covered with an overlying protective film or release liner 38. Double-sided pressure sensitive tape may be applied if expedient. Removal of the film 38 exposes the adhesive 36 which may be utilized to attach the indicator 10 to any surface. Since it is contemplated that the indicator 10 be approximately one inch (25.4 mm) in diameter, the indicator may be conveniently attached to a relatively small package to be monitored for the application of force or pressure or exposure to a critical temperature.

In operation as a force indicator, the indicator 10 is attached to a surface to be protected, i.e., a package or pallet, by means of the adhesive 36, and the dome 32 is permitted to remain in the non-activated position. When a force is applied to the dome 32, as by an overlying package or pallet, the dome 32 snaps to its activated position as shown in FIG. 3 whereby the indicating wick 24 is forced into contact with the porous pad 20. As indicated above, the concentration gradient between the wick 24 and the pad 20 results in migration of the dyed chemical from the pad 20 to the wick 24, thus providing a rapid visual indication that the indicator 10 has been subjected to the application of force.

In this application, the porous pad 20 is saturated or partially saturated with a solution of a dye and a chemical which will remain a liquid at normally encountered ambient conditions. An example is di-2-ethyl hexyl phthalate available from the Ashland Chemical Company) which is colorless and liquid at temperatures above −49 degrees Fahrenheit (−45 degrees Celsius) in which is dissolved Oil Blue A (available from E. I. DuPont De Nemours and Company); a solid blue dye.

A small hole 40 communicating between the outer surface of the cover 26 and the inner reservoir 16 is provided in the ledge 30 to permit the escape of air trapped within the indicator 10 as the dome 32 moves from its non-activated position to its activated position. Alternatively, a hole may be provided through the dome 32 or through the wall 28 and a shoulder 14 after assembly or the cover boundary 34 may not be completely sealed around its perimeter to the base 12.

To provide an indicating device 10 responsive to changes in atmospheric pressure, the cover boundary 34 is completely circumferentially sealed to the base 12 end the hole 40 is not included so as to provide an inner space within the indicator 10 hermetically sealed from the ambience. An increase in ambient pressure acting on the outer surface area of the dome 32 results in a force acting on the dome 32 toward the base 12. When this force is sufficient to overcome the natural resiliency of the material comprising the dome 32 and the internal airpressure, the dome 32 will move to its activated position and force the wick 24 into contact with the pad 20 as described previously. Thus a rapid visual indication of a predetermined change in atmospheric pressure is provided.

The change in atmospheric pressure necessary to activate the indicator 10 may be adjusted by varying the material, the material thickness and/or the radius of curvature of the cover dome 32. Response to pressures below atmospheric may be accomplished by evacuating the interior of the indicator 10 during or subsequent to assembly. Also, pressures significantly above atmospheric may be sensed by providing the interior of the indicator 10 with a pressure, during or subsequent to assembly, above that of atmospheric pressure. The range of such indicated pressures is limited only by the material used to construct the cover 26 and the base 12 and by the compatibility of the dyed chemical with partial vacuum or pressure conditions.

The indicator 10 may also be used to indicate exposure of the indicator 10 to a temperature condition above a predetermined critical temperature. The pad 20 is saturated with a solution of a dye and a chemical which will remain in its solid phase below a critical temperature and which will change to its liquid phase above such critical temperature. For example, if it were desirous to indicate visually that a package, for example, was exposed to a temperature above the freezing point of water, the dye would be mixed with a chemical which remained in its solid phase at a temperature below 32 degrees Fahrenheit (0 degrees Celsius) and changed to its liquid phase when that temperature was reached. Such a chemical may be Octyl Caprate which goes through its solid to liquid phase change at 30 degrees Fahrenheit (−1.1 degrees Celsius).

In operation to indicate that the critical temperature of for example, 30 degrees Fahrenheit (−1.1 degrees Celsius) has been reached, the indicator 10 would be attached to an item by means of the adhesive 36, and conditioned to the temperature of the item, which would be below the critical temperature. The dome 32 would then be manually activated, as by finger pressure, to force the indicating wick 24 into contact with the porous pad 20. No transfer of the dyed chemical to the wick 24 would occur at this time, however, since the chemical would be in a solid physical state. If the critical temperature of 30 degrees Fahrenheit (−1.1 degrees Celsius) is subsequently reached, the dyed chemical will pass through a phase change from solid to liquid and thereby allow the dyed chemical contained within the pad 20 to migrate into the indicator wick 24. The presence of dyed chemical in the indicator wick 24 will thus provide a visual indication that the indicator 10, and the attached item, have been exposed to a temperature above the selected critical temperature.

If the temperature is subsequently lowered below 30 degrees Fahrenheit (−1.1 degrees Celsius) once again, the dyed chemical remains in the wick as a continual warning that the indicator 10 and the item were exposed to an elevated temperature.

In practice it is found that a small spot of dyed chemical usually appears at the point of contact between the pad 20 and the wick 24 at a temperature just slightly below the selected critical temperature. If this is undesirable, the wick 24 may be overprinted with an opaque substance at the point of contact to mask the premature indication. The wick may also bear any desired operating instructions.

It will be recognized that a wide range of critical temperatures may be indicated by suitable selection of the chemical to be mixed with the indicating dye. Chemicals are well known in the art which will progress through a solid to liquid phase change at temperatures ranging from well below the freezing point of water to temperatures well in excess of room temperature.

It should also be recognized that the adhesive, dye and materials used to construct the indicator 10 must be compatible with the desired operating and critical indicating temperatures. Such materials, dyes and adhesives are well known in the art and need not be indicated herein.

Referring now to FIG. 4, an indicator 10 is shown which is constructed in the same manner and of the same materials as the indicator 10 of FIGS. 1-3, with the exception that the convex dome 42 of the cover 26 has a smaller peripheral diameter than the dome 32 shown in FIGS. 1-3 and the periphery is recessed below the level of the shoulders 14 by providing a ledge 44 inclined inwardly and downwardly. In this manner, an indicator 10 is provided which will still be responsive to critical temperature changes and ambient pressure changes as described above, but which will be resistant to accidental force activations. The application of a force to the dome 42 by a relatively flat surface of an object which spans the shoulders 14 will not cause the dome 42 to snap to its activated position since the dome 42 is recessed sufficiently to accept deflection to the level of the shoulders 14 without moving to its activated position of stability. Thus an indicator 10 is provided which will be activated only upon application of a force to the recessed dome 42 alone and not a force which is limited in travel by the shoulders 14. Unintentional activation will therefore be greatly reduced.

FIG. 5 is a plan view of an embodiment of the indicator 10 which shows tee circular indicating wick 24 replaced by a transparent disc 46 having attached thereto, by any suitable means, a thin strip indicating wick 48 as further illustrated in FIG. 6.

Although dyed chemical migration through the wick 24 of any embodiment of the invention will take a finite length of time and thus provide a time interval indication, the strip wick 48 is utilized to emphasize the time interval aspect of the indication of the application of force or pressure, or exposure of the indicator 10 to a critical temperature. The disc 46 and the strip wick 48 operate in conjunction in the same manner as the circular indicating wick 24, i.e. when the cover domes 32 or 42 move to the concave activated position, the transparent disc 46 is deformed downwardly carrying one end of the strip wick 48 into contact with the porous pad 20. When the wick 48 contacts the pad 20, dyed chemical begins to migrate from the pad 20 to the wick 48. By controlling the concentration of the dyed chemical within the pad 20 and by suitable selection of the material comprising the wick 48, the rate of migration of dyed chemical from the pad 20 through the strip wick 48 may be controlled at given temperature conditions. The progress of dyed chemical along the strip wick 48 will provide an indication not only that the indicator 10 has been exposed to a predetermined force, pressure or critical temperature, but will also provide a visual indication of the length of time of such exposure. As should be apparent, the strip wick 48 and the transparent disc 46 may be used in conjunction with either of the indicators 10 shown in FIGS. 2 or 4.

FIG. 7 illustrates yet another embodiment of the indicator 10 which may reduce manufacturing costs while retaining the advantages of the indicators 10 described above.

In this embodiment, the shoulders 14 have been eliminated from the base 12 of FIGS. 1–4 resulting in a base 50 which is simply a thin disc to which is attached the pad 20, the cover 26 and the adhesive 36. The shoulders 14 may be eliminated because the wick 24 is spaced from the pad 20 by attaching the wick 24 to the inside of the cover 26 rather than relying on support from the shoulders 14 to provide the necessary pad 20 to wick 24 spacing.

The wick 24 may be attached to the cover 26 by any suitable means, preferably a clear adhesive.

The indicator 10 shown in FIG. 7 operates as explained above with respect to FIGS. 1–4 in that when the predetermined force or pressure condition occurs, the cover dome 32 moves to its concave activated position carrying and forcing the wick 24 into contact with the pad 20.

Figure 8:
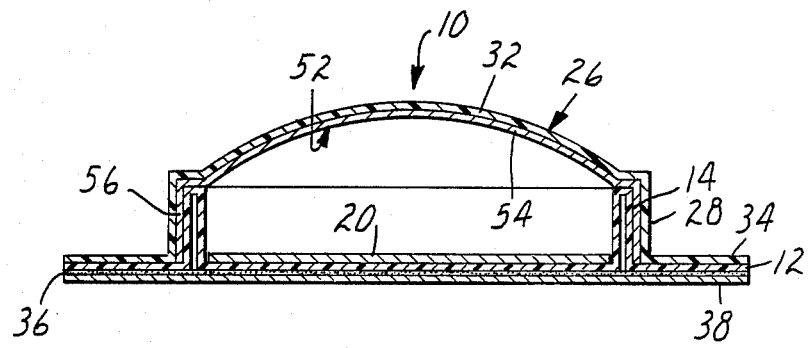
FIG. 8 is a diametrical cross-section of still another embodiment in which the wick conforms to the cover.

Still another and perhaps preferable embodiment of the indicator 10 is shown in FIG. 8 which is distinguished by a wick 52 formed as a domed cylindrical cap conforming to the inner surface of the cover 26. The wick 52 includes a spherically arched central portion 54 spanning the shoulders 14 and a cylindrical wall 56 extending to the base 12 between the outer surfaces of the shoulders 14 and the inner surface of the cover 26.

The wick 52 may be die formed of extensible absorbent crepe paper such as that produced by the Thilmany Pulp and Paper Company. Such paper allows the wick 52 to conform to the careers and compound curves of the cover 26 without wrinkling or folding.

Such a wick 52 may be preferable to the wick 24, 48 configurations described above in that it completely blocks the internal structure of the indicator 10 from view and the extra length of paper provided by arching the central portion 54, rather than extending the wick 52 directly across the shoulders 14, permits the paper to more readily accept the deformation and elongation caused by movement of the cover 26 to the activated position.

Extensible crepe paper such as described above with respect to FIG. 8 may be used advantageously in connection with the previously described embodiments to reduce or eliminate any wrinkling or folding which may occur during assembly or activation of the cover 26.

Finally, it should be recognized that either of the embodiments shown in FIGS. 7 or 8 could be provided with a recessed dome 42 as shown in FIG. 4.

It will be appreciated from the above description that an indicator 10 is provided which is compact, economical to manufacture and which will provide a visual indication of a variety of conditions and a wide range of values of those conditions. Because the porous pad 20 is maintained in a spaced relationship from the indicating wicks 24, 48 or 52, storage considerations are simplified since the possibility of accidental or premature indication is greatly reduced. And since the dyed chemical is contained in the pad 20 rather than in the form of a free pool of liquid, the indicator 10 may be stored in any position.

While the present invention has been described in connection with certain specific embodiments, it is to be understood that it is not to be limited to those embodiments. For example, the positions of the wick 24 and the pad 20 could be reversed if it were desired to view the indicator 10 from the bottom rather than the top. Also, the visual indication could be obtained by saturating the pad 20 with a chemical and providing the wick 24, 48 or 52 with a reactant, as described in above-identified U.S. Pat. No. 3,954,011. The invention is intended to cover all alternatives and modifications falling within the spirit and scope of the appended claims.

I claim:

1. An irreversible, snap-action indicating device comprising:
    a flat base;
    an upstanding arcuate wall projecting from said base to define a shoulder spaced from said base;
    a liquid saturable pad within said wall and adjacent said base;
    a liquid contained within said pad and including a coloring dye;
    a wick having a circular edge supported by said shoulder, said wick spanning said shoulder in spaced relationship to said base and said pad; and
    a transparent cover overlying said wick and clampingly maintaining said wick edge against said shoulder, said cover including a shallowly curved, exteriorly convex spherical dome extending in a first position of stability away from said base and said wick, said cover having a radius selected to permit a snap movement from said first position of stability to a second position of stability and opposite curvature upon the application of force to said cover while in said first position, said snap movement of said cover from said first to said second position carrying and forcing said wick into pressure contact with said pad so that said liquid will be absorbed by said wick from said pad, said liquid thereby coloring said wick and providing a visual indication through said transparent cover that sufficient force has been applied to said cover to cause said snap movement.

2. An indicating device according to claim 1 further including a locating slot through said shoulder and a tab extending from said saturable pad through said slot and constrained against said base by said cover, said slot and said tab cooperating to constrict rotation of said saturable pad.

3. An indicating device according to claim 1 wherein said base comprises a pressure sensitive adhesive affording attachment of said device to a surface.

4. An indicating device according to claim 1 wherein said base comprises a planar surface, a pressure sensitive adhesive overlying said planar surface for attaching said device to a surface and a protective release liner overlying said adhesive.

* * * * *

UNITED STATES PATENT AND TRADEMARK OFFICE
CERTIFICATE OF CORRECTION

PATENT NO. : 4,793,717

DATED : December 27, 1988

INVENTOR(S) : Wendell J. Manske

It is certified that error appears in the above-identified patent and that said Letters Patent is hereby corrected as shown below:

Col. 3, line 47, "saturable-e" should read --saturable--.

Col. 4, line 19, "base 22" should read --base 12--.

Col. 5, line 22, "there should be a "(" before the word --available--.

Col. 5, line 38, "end" should read --and--.

Col. 6, line 14, there should be a "," after the word --of--.

Col. 7, line 15, "tee" should read --the--.

Col. 8, line 10, "careers" should read --corners--.

Signed and Sealed this

Fifteenth Day of August, 1989

Attest:

DONALD J. QUIGG

Attesting Officer

Commissioner of Patents and Trademarks